Sept. 20, 1932.  J. ROBINSON  1,878,712
AUTOMATIC TRAIN PIPE COUPLING
Original Filed Nov. 20, 1920   2 Sheets-Sheet 1

Joseph Robinson INVENTOR
By Watson, Coit, Morse & Grindle
ATTORNEYS

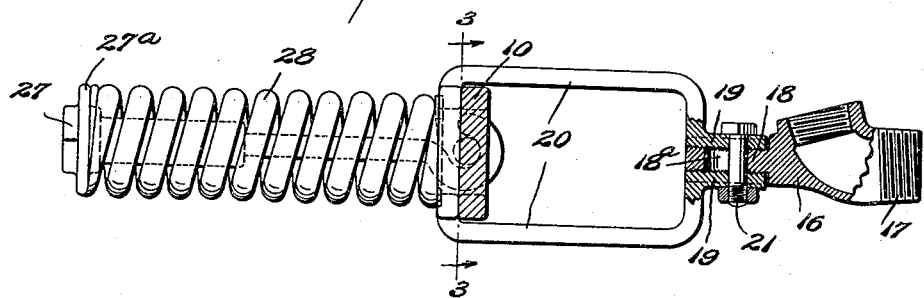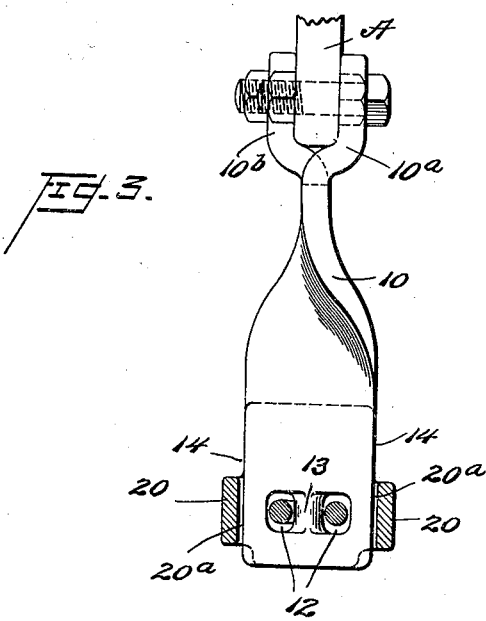

Patented Sept. 20, 1932

1,878,712

UNITED STATES PATENT OFFICE

JOSEPH ROBINSON, OF NEW YORK, N. Y.

AUTOMATIC TRAIN PIPE COUPLING

Application filed November 20, 1920, Serial No. 425,449. Renewed February 2, 1932.

My invention relates to improvements in automatic train pipe couplings and comprises certain features of construction, combinations and arrangements hereinafter described and claimed.

Certain objects of the invention are to provide an improved arrangement of universal joint for permitting motion of the connector head in all directions, an improved form of supporting bracket, improved means for permitting adjustment of the connector head relative to the bracket and other detailed improvements described in the following specification, pointed out in the appended claims and illustrated in the accompanying drawings, in which Figure 1 is a side elevation partly in section of my improved construction;

Figure 2 is a plan view partly in section showing the relative arrangement of the bracket and yoke for supporting the head and also the arrangement for adjustably securing the connector head to the yoke;

Figure 3 is a sectional view on the line 3—3 of Fig. 2 showing the improved bracket in rear elevation.

Figure 1:
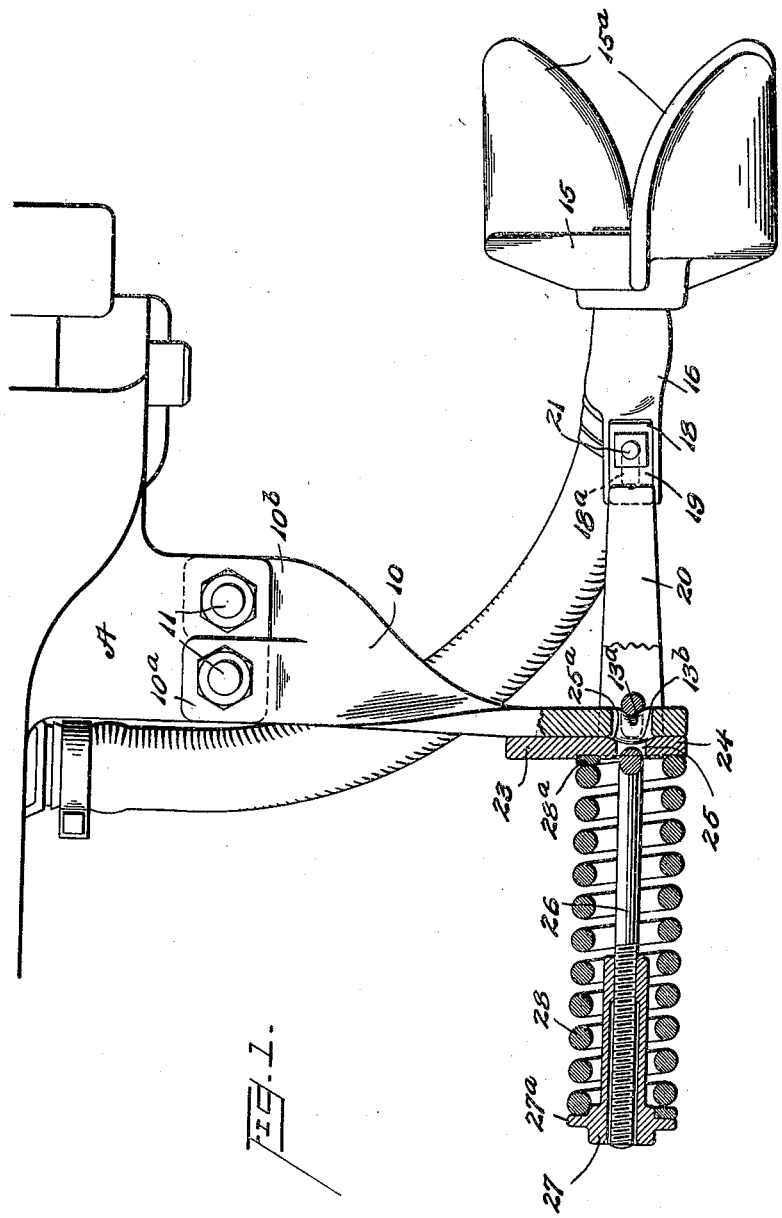

Referring to the drawings in detail 10 represents the base or supporting bracket in my improved construction, this bracket being secured to the usual lug A mounted on the car coupler. The base 10 is preferably made from a flat bar of metal rectangular in cross-section which is twisted intermediate its ends so that the end portions stand at an angle of ninety degrees to each other. One end of the base is split a short distance and such split portions are bent laterally to form ears 10a, 10b which are spaced a proper distance to engage on opposite sides of the lug A. The base 10 is secured to the lug A of the car coupler by means of bolts 11 which pass through suitable openings in this lug and in the ears 10a, 10b, these bolts serving to rigidly hold the base in position on the car coupler. The lower end of the base 10 which lies transversely of the length of the car is provided with openings 12 between which there is arranged an anchor device 13 preferably formed integrally with the base but such anchor device may, of course, be formed of a separate piece of metal secured to the base in any suitable manner.

The anchor device 13 is arranged vertically and preferably made cylindrical in shape or provided with a suitably curved exterior surface particularly the front portion thereof and such front portion is also formed with a curved or rounded depression 13a. The rear portion of the anchor device 13 projects a slight distance beyond the rear face of the base 10 and such portion is curved in a vertical direction as shown at 13b. The lower portion of the base 10 is provided with vertical edges 14 which extend upwardly from the bottom thereof and are preferably made straight for reasons which will hereafter appear.

The coupling head 15 of my improved construction may be provided with any desired means such as the ordinary guiding prongs 15a for aligning it with a counterpart head. Mounted upon the rear of the head 15 is a conduit 16 having a threaded end 17 adapted to be secured in the head 15 or if desired these parts may be made integral or secured together in any other suitable manner. At its rear portion the conduit 16 is provided with a rectangular projection 18 which is slotted as at 18a and which is adapted to engage between forwardly projecting ears 19 formed on the front end of the member 20 hereinafter described. The contacting faces of the projection 18 and ears 19 are preferably roughened or serrated and these parts are held together by means of a bolt 21 passing therethrough, the bolt 21 engaging in the slot 18a in the projection 18. The construction just described provides means by which the connector head 15 when uncoupled may be adjusted relative to the member 20 or toward and from the base 10 upon which this member is supported and the roughened or serrated surfaces of the projection 18 and ears 19 serve to securely hold these parts from relative movement when the same are clamped together in the desired position by means of the bolt 21.

The member 20 which is in the form of a yoke is composed of two spaced arms adapted to lie on opposite sides of the base or bracket 10 the arms having straight inner surfaces 20a which engage the vertical edges 14 of the bracket 10 by which construction undue rotation of the connector head is prevented. The edges 14 of the bracket being straight it will be seen that the yoke 20 may be detached from or applied to the bracket by moving the same downwardly or upwardly relative to the bracket while the connector head remains in contact with the mating head, the tie rod 26 of course being detached from the bracket at such time. The yoke 20 extends rearwardly of the base 10 and is adapted to bear upon the rear face of the same. This yoke is provided on its rear portion with an upwardly extending flange 23 and a downwardly extending flange 24 which are also adapted to rest against the rear face of the bracket 10. The rear portion of the yoke 20 is also provided with an opening 25 through which a tie rod 26 extends, the front edges of this opening being suitably shaped as shown at 25a to bear against the rearwardly projecting curved portion 13b of the anchor device 13. The front end of the tie rod 26 is bent to form a hook which engages the curved front surface of the anchor device 13 heretofore mentioned. The hooked portion of the tie rod 26 is also formed with a curved inner surface which engages the curved depression 13a of the anchor device 13. The rear end of the tie rod 26 is threaded and a nut 27 provided with an abutment 27a is adjustably mounted thereon. A coiled spring 28 surrounds the tie rod 26 and is arranged between the abutment 27a and the rear portion of the yoke 20 which is provided with a suitable seat 28a to receive the end of the spring.

It will be understood that the spring 28 serves to yieldingly hold the yoke 20 and flanges 23, 24 against the rear side of the base 10, the tension of the spring being regulated by adjustment of the nut 27. The coupling head 15 is thus held in position to contact with a mating head. The tie rod 26 and anchor device 13 with their cooperative curved surfaces form an arrangement which is simple and durable in construction and which permits smooth easy movement of the head in all directions. The base or bracket 10 for supporting the other mechanism is also simple in construction and can be easily and cheaply manufactured and serves to rigidly secure the mechanism in position. The adjustable connection between the yoke 20 and conduit 16 is also an important feature of my improved construction in that it permits varying the distance between the base and head to compensate for wear between the knuckles of the car coupler. The yoke 20 is preferably made so that the ears 19 when not engaged by the bolt 21 remain separated a distance greater than the thickness of the projection 18. This enables easy insertion of said projection between the ears and adjustment of the same when the bolt 21 is loosened.

Having thus described my invention what I claim as new and desire to secure by Letters Patent is:

1. In an automatic train pipe coupling, a base having on each side a straight vertical edge extending from the bottom thereof upwardly, a coupling head, a yoke for supporting said head in front of said base, said yoke extending to the rear of said base, and having spaced arms provided with straight surfaces for engaging the straight vertical edges of said base, whereby undue rotation of said yoke and head are prevented, said arms being free to slide vertically relative to said vertical edges of the bracket, to thereby permit free up and down movement of said head, and means for yieldingly holding said yoke against the rear side of said base.

2. In an automatic train pipe coupling, the combination with a car coupler having a lug formed thereon, a base formed of a flat piece of metal twisted intermediate its ends, one end thereof being split and such split portions bent laterally to form ears for engaging on opposite sides of said lug, and means carried on the other end of said base for yieldingly supporting a coupling head.

3. In an automatic train pipe coupling, the combination with a car coupler having a lug formed thereon, a base formed of a flat piece of metal twisted intermediate its ends, one end thereof being split and such split portions bent laterally to form ears for engaging on opposite sides of said lugs, the other end of said base having an anchor device integral therewith, a yoke engaging the rear of said base and extending forwardly thereof to support a coupling head, a tie rod engaging said anchor device, and a spring surrounding said rod and bearing against said yoke.

4. A base for supporting a train pipe coupling comprising a flat piece of metal twisted intermediate its ends so that the end portions thereof stand at an angle of substantially ninety degrees to each other, one of said end portions being split and such split portions bent laterally to form ears for engaging a suitable supporting lug, the other end portion having openings and an anchor device arranged between such openings.

5. In an automatic train pipe coupling, a base, a coupling head, a supporting member therefor, means for yieldingly securing said member to the base so as to project said head in front of the base, means for varying the distance between said head and base when the head is in normal uncoupled position, and means for clamping the parts after the position of the head is changed relative to the base.

6. In an automatic train pipe coupling, a base, a member yieldingly supported thereon, a coupling head carried by said member, and cooperating means carried by said member and said head by which the distance of said head from the base may be varied when the head is in uncoupled position.

7. In an automatic train pipe coupling, a base, a coupling head, a conduit secured thereto, a member extending in front of said base for supporting said conduit and head, the front end of said member and the rear end of said conduit being adjustably connected together whereby the distance between said head and base may be varied, and means for yieldingly supporting said member on said base.

8. In an automatic train pipe coupling, a base, a member yieldingly supported thereon and normally extending in front of the base, a conduit supported on the front end of said member, means for adjustably connecting said conduit to said member, said means comprising spaced ears on one of said parts and a projection on the other and a fastening device extending through the same, and a coupling head secured to said conduit.

9. In an automatic train pipe coupling, a base, a coupling head, means for varying the distance between said head and base, said means comprising a part carried by the base and supporting said head, and a part secured to the head, an adjustable connection between said parts, and means for locking the parts together.

10. In an automatic train pipe coupling, a base, a coupling head, means for varying the distance between said head and base, said means comprising a part carried by the base and supporting said head and a part secured to the head, said parts having adjustable cooperating portions and means for clamping said portions together.

11. In an automatic train pipe coupling, a base, a coupling head, means for varying the distance between said base and head, said means comprising a part supported on said base, and a part secured to the head, one of said parts being adjustably secured in the other, and means for clamping one part in the other.

12. In an automatic train pipe coupling, a bracket having on each side a substantially straight vertical unobstructed edge extending substantially from the bottom therof upwardly, said bracket also having near the lower end thereof spaced openings, the material of the bracket between said openings being shaped to form an anchor device, a coupling head, a yoke for supporting said head in front of said bracket, said yoke extending to the rear of said bracket and having spaced arms provided with substantially straight surfaces for cooperating with said straight vertical edges of said bracket, whereby undue rotation of said yoke and head is prevented, said arms being free to slide vertically relative to said bracket to permit vertical movement of said head, a tie rod pivotally engaging said anchor device and extending rearwardly of the bracket, and a spring carried by said tie rod and bearing against the rear end of said yoke.

13. In an automatic train pipe coupling, a coupling head, the combination of a bracket having openings at the lower end thereof, an anchor device integral with said bracket extending between said openings, said bracket also having on each side a vertically arranged straight unobstructed edge, a yoke for supporting said head in front of the bracket, said yoke having rearwardly extending spaced arms provided with substantially straight vertically arranged inner surfaces for cooperating with said straight edges of the bracket to prevent rotation of said yoke on its longitudinal axis, said arms being free to slide vertically relative to said edges of the bracket, a tie rod pivotally engaging said anchor device and extending rearwardly of the bracket, a spring supported by said tie rod and bearing against the rear end of said yoke for normally pressing the same against said bracket.

14. In an automatic train pipe coupling, a coupling head, a bracket having an anchor device adjacent the lower end thereof, said bracket also having on each side a vertically arranged straight unobstructed edge, a yoke for supporting said head in front of the bracket, said yoke having rearwardly extending spaced arms provided with substantially straight vertically arranged inner surfaces for cooperating with said straight edges of the bracket to prevent rotation of said yoke on its longitudinal axis, said arms being free to slide vertically relative to said edges of the bracket when the yoke is forced rearwardly relative to the bracket, a tie rod pivotally engaging said anchor device and extending rearwardly of the bracket, a spring supported by said tie rod and bearing against the rear end of said yoke for pressing the yoke toward said bracket.

15. In an automatic train pipe coupling, a coupling head, a bracket having an anchor device at its lower end, a yoke for supporting said head in front of the bracket, said yoke having spaced arms extending rearwardly from said head and spanning said bracket, said arms being free to move vertically relative to said bracket to permit free up-and-down movement of said head, a tie rod pivotally engaging said anchor device and extending rearwardly of the bracket, a spring supported by said tie rod and bearing against said yoke to normally press the same toward said bracket.

In testimony whereof I affix my signature.

JOSEPH ROBINSON.